United States Patent [19]
Barre et al.

[11] Patent Number: 4,748,673
[45] Date of Patent: May 31, 1988

[54] READER FOR READING MAGNETO-OPTICAL CHARACTERS, WITH THE OPTIONS OF PRINTING THEM OR STORING THEM

[75] Inventors: Yvon Barre, Fleury; Bernard Deleuze, Paris; Lionel Maury, Buc, all of France

[73] Assignee: Electronique Serge Dassault, Paris, France

[21] Appl. No.: 740,966

[22] Filed: Jun. 4, 1985

[30] Foreign Application Priority Data

Jun. 8, 1984 [FR] France .................. 84 09082

[51] Int. Cl.⁴ .................. G06K 9/18
[52] U.S. Cl. .................. 382/7; 382/12
[58] Field of Search .................. 382/7, 12, 64, 65; 235/449, 379

[56] References Cited

U.S. PATENT DOCUMENTS

| | | | |
|---|---|---|---|
| 3,949,363 | 4/1976 | Holm | 382/7 |
| 4,023,203 | 5/1977 | Baba et al. | 360/26 |
| 4,040,108 | 8/1977 | Nakata | 360/101 |
| 4,331,863 | 5/1982 | Sidline et al. | 235/449 |
| 4,345,168 | 8/1982 | Fisher | 307/351 |
| 4,385,285 | 5/1983 | Horst et al. | 382/7 |
| 4,404,649 | 9/1983 | Nunley et al. | 235/379 |

FOREIGN PATENT DOCUMENTS

| | | |
|---|---|---|
| 2709379 | 9/1978 | Fed. Rep. of Germany . |
| 2441222 | 7/1980 | France .................. 382/7 |
| 2515390 | 4/1983 | France . |
| 2114346 | 8/1983 | United Kingdom . |

OTHER PUBLICATIONS

Article entitled "Handpulled Magnetic Card, Mass Storage System for a Portable Computer"—by K. R. Hoecker et al—pp. 15-23, Jun. 83.

*Primary Examiner*—Leo H. Boudreau
*Assistant Examiner*—Steven Brim
*Attorney, Agent, or Firm*—Karl F. Ross; Herbert Dubno

[57] ABSTRACT

A reader for reading magneto-optical characters, with the options of printing them or storing them.

A track is provided for driving a check from an inlet plate (T1) over various portions of path (T2, T3 and T4). Wheels (G1 and G2) are provided beneath the path, and may be motor driven. Above said wheels there are heads (TM1 and TM2) respectively for pre-magnetizating and reading CMC7 characters. Each head is mounted on one arm of a corresponding bell crank (L1, L2) which cranks are pivoted to a frame at their corners (L10 and L20). The other arm (L12 and L22) of said bell cranks are resiliently urged by springs (L15 and L25) mounted on an actuator rod (AC) which is itself driven by an electromagnet (EM2). It has turned out that such an assembly ensures effective transducer operation of the heads (TM1 and TM2) for reading CMC7 characters.

9 Claims, 7 Drawing Sheets

INPUT AA — FIG. 9A

OUTPUT AA — FIG. 9B

OUTPUT MC1 — FIG. 9C

V (MC 23) — FIG. 9D

OUTPUT MC 20 — FIG. 9E
OUTPUT MC 26 — FIG. 9F
OUTPUT MC 28 — FIG. 9G
OUTPUT ML 1 — FIG. 9H
OUTPUT ML 2 — FIG. 9J

READER FOR READING MAGNETO-OPTICAL CHARACTERS, WITH THE OPTIONS OF PRINTING THEM OR STORING THEM

FIELD OF THE INVENTION

The invention relates to point of sale terminals for at least partially automatic commercial and financial transactions.

Such terminals are intended for installation, for example, in a shop or other commercial premises in which transactions are performed with clients who usually pay by check.

BACKGROUND OF THE INVENTION

Terminals of this type are already known for paying-in (i.e. a financial transaction) subsequent to a commercial transaction. There also exist terminals capable of filling-in a blank check, and in particular of filling-in the amount to be paid, so that the customer only has to sign. However, such terminals remain unsatisfactory, in that the shopkeeper must still manually key-in customer details for accounting purposes. Also, banking operations on checks (and in particular clearing house operations), are expensive and any simplification thereto would be welcome.

OBJECT OF THE INVENTION

It is the object of the present invention to provide solutions to these problems.

SUMMARY OF THE INVENTION

According to a first characteristic of the invention a reader is provided for reading magneto-optical characters on checks, e.g. characters of the CMC7 type or of the variant E13B type, the reader including a track suitable for receiving and displacing a document having such characters in a predetermined position, e.g. a check, a head or other means for premagnetizing the characters, a character read transducer, and electronic control and processing means connected to said transducer. Reading the magneto-optical characters is a rather difficult operation for which it has previously been believed that the heads or transducers had to be situated in a fixed position relative to the document being read. In contrast, the present invention provides for the track to include document-receiving wheels whose axes are fixed relative to a frame of the reader, while the transducers are provided with a floating mount opposite respective ones of said wheels, and are controllably resiliently urgeable towards said wheels.

Further, this disposition also makes it possible to use the mechanism for inserting other documents on which printing is to take place.

In a preferred embodiment, each transducer is mounted at the end of one of the arms of a corresponding L-shaped crank, said cranks being pivoted at their angles to the frame, and the ends of the other arms of the two cranks are actuated via corresponding resilient means by an actuator rod controlled by an electromagnet.

Advantageously, the actuator rod is itself subjected to resilient return means operating against the thrust direction of the electromagnet.

It turns out that such an assembly enables magneto-optical characters to be read correctly in spite of the previous prejudice against such a "floating" mount for the heads.

According to another characteristic of the invention, electronic read means are associated with these transducers, said electronic read means comprising:

analog amplifier means having an anti-saturation gain characteristic;

first comparator means including hysteresis and having a signal input connected to the output from the analog amplifier means, a reference input receiving a reference voltage close to 0 V, an output, and an output connection to the reference input in order to obtain said hysteresis;

second, high-speed comparator means having a signal input connected to the output from the analog amplifier means means and a reference input connected to the output from the first comparator means, via a capacitive circuit including a diode, and to the output from said second comparator means via a further diode connection; and logic means for providing a logic signal representative of the characters read, on the basis of the output signals from the two comparator means.

In an advantageous embodiment, the analog amplifier means comprise, in series:

a low-noise preamplifier;
a mains (powerline) rumble filter;
an amplifier;
a background noise limiter circuit; and
an amplifier having a non-linear anti-saturation gain characteristic.

The logic means preferably comprises:

a memory-constituting first bistable circuit having a clock input controlled via a NAND gate by the outputs from the first and second comparator means, and a reset to zero input controlled by the output from the first comparator means;

a divide-by-two second bistable circuit controlled by the output from the first bistable circuit and supplying a logic signal representative of the characters being read.

According to another characteristic of the invention, the above-defined reader further includes electronic means suitable for performing a commercial transaction, together with printer means and control logic means. The control logic means is arranged to supply a sequence of controls suitable for reading the magneto-optical characters on a check and for causing the amount of a transaction to be printed on the check once both parties to a commercial transaction are in agreement.

Preferably, the logic control means also causes a customer ticket to be printed out, together with a shopkeeper's journal or record. The journal may be printed on a continuous roll and may include a copy of the characteristics read from the check. Alternatively, or additionally, the full characteristics of a transaction may be stored in an electronic memory belonging to the shopkeeper.

According to yet another characteristic of the invention, the logic control means are additionally suitable for supplying a local memory or a distant memory with electric signals which represent, in conjunction, the characters read from the check and also the characteristics of the transaction, thereby enabling bank processing of such checks to be simplified.

In other words, once an electronic memory (either at the shopkeeper's premises or at a central location) stores the full characteristics both of the check and of the transaction, much of the subsequent check-clearing operation may be entirely automated.

BRIEF DESCRIPTION OF THE DRAWING

An embodiment of the invention is described, by way of example, with reference to the accompanying drawing, in which:

FIGS. 8A and 8B are diagrams of waveforms obtained when reading CMC7 characters; and FIGS. 9A to 9J are waveform diagrams serving to explain the operation of the read means shown in FIGS. 6 and 7.

SPECIFIC DESCRIPTION

Figure 1:
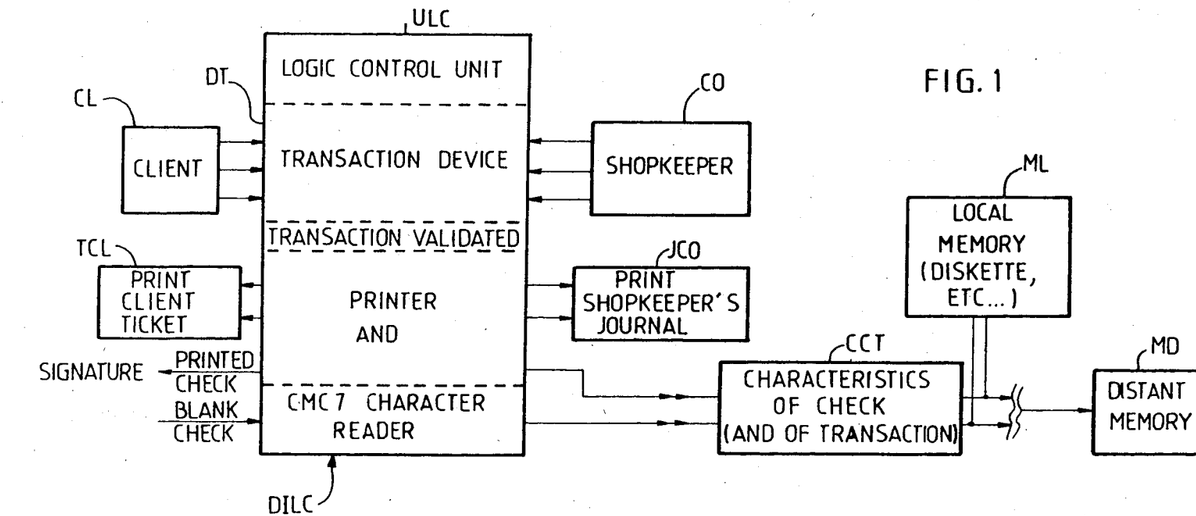
FIG. 1 is a block diagram showing the general structure of a terminal in accordance with the invention.

In FIG. 1, reference ULC designates a logic control unit which controls:

a transaction device DT for performing a transaction between a client CL and a shopkeeper CO. In the simplest version, the transaction device is a cash register, optionally including a keyboard for customer validation; and a printer and CMC7 character reader, given the overall reference DILC.

In conventional manner, the printer and reader is suitable for printing a client's ticket TCL and also a shopkeeper's journal JCO, which may be in the form of a continuous strip. A blank check may be inserted into the printer and reader DILC which then returns the check with the amount of the transaction filled in, for signature by the client.

As is shown below, the set of devices under the control of the logic control unit ULC serves to provide electrical signals representative of the characteristics of the check and of the transaction to a unit CCT, which then records said characteristics in a local memory ML (e.g. a diskette) and/or transmits the characteristics to a distant memory MD (e.g. via the telephone network).

Figure 2:
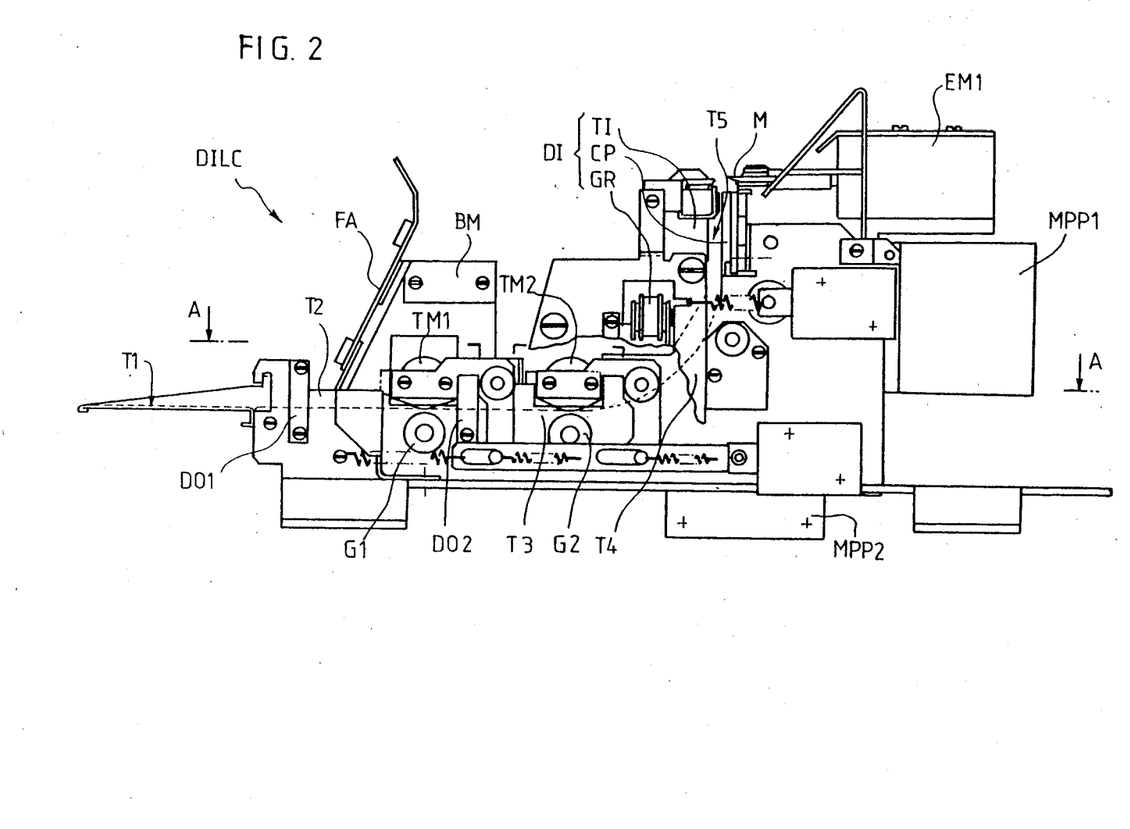
FIG. 2 is a side view showing the main mechanisms of the printer and of the CMC7 character reader shown in FIG. 1.

FIG. 2 is a general view of the printer and reader DILC. FA is a plate for supporting the front face of the apparatus, and also various parts BM which constitute the frame for the mechanism. The printer DI per se which may be of conventional structure comprises a print head at TI, e.g. a matrix print head (not shown in detail), fitted with a backing plate CP and including a return wheel GR for moving the print head. All the movements required in the printer and reader DILC may be derived from a stepper motor MPP1.

A first reel (not shown) provides a strip of paper on which the print head TI may print a client ticket, which is finally removed by a guillotine M under the control of an electromagnet EM1. A second reel provides a second continuous roll of paper which is presented on the backing plate CP adjacent to the first roll in order to receive the shopkeeper's journal from the print head.

Figure 3:
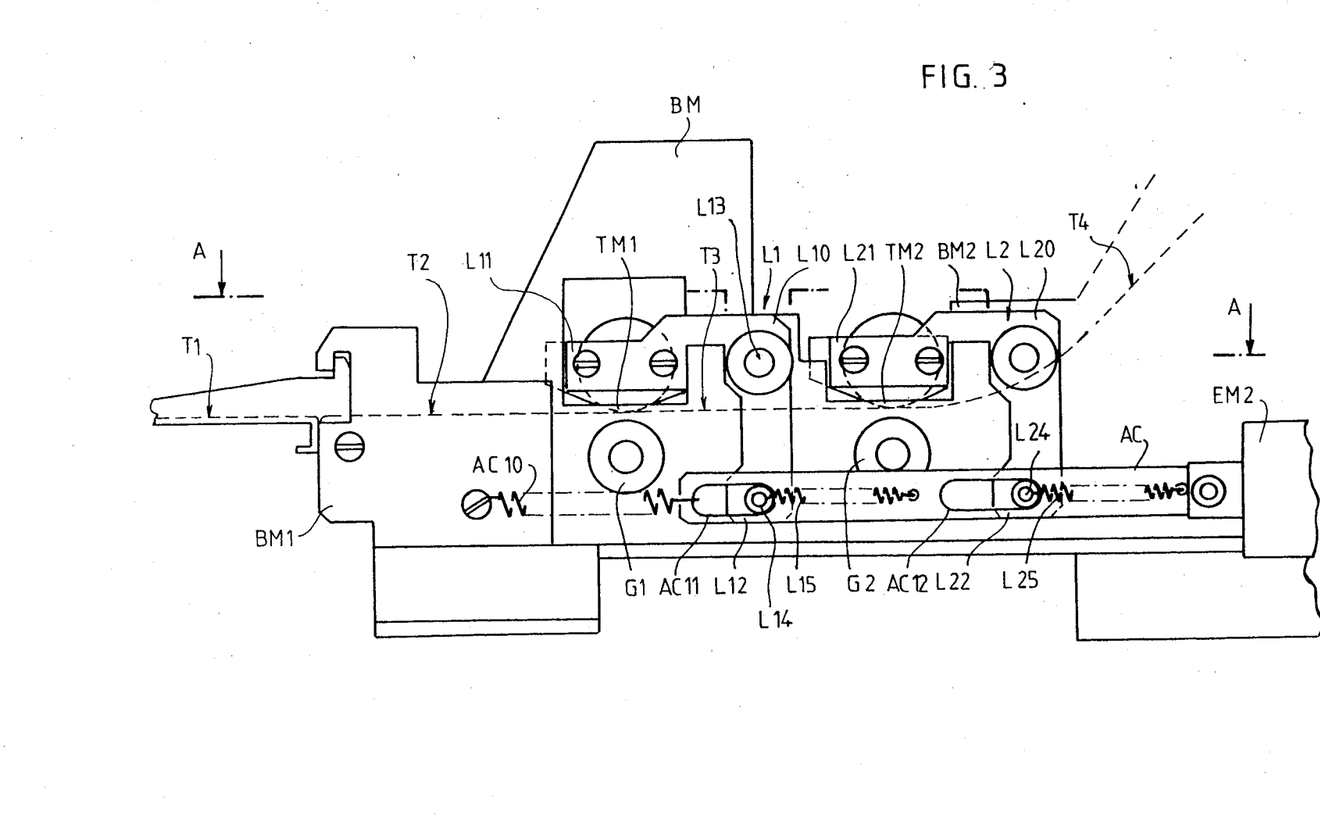
FIG. 3 is a simplified view of a part of FIG. 2.
Figure 4:
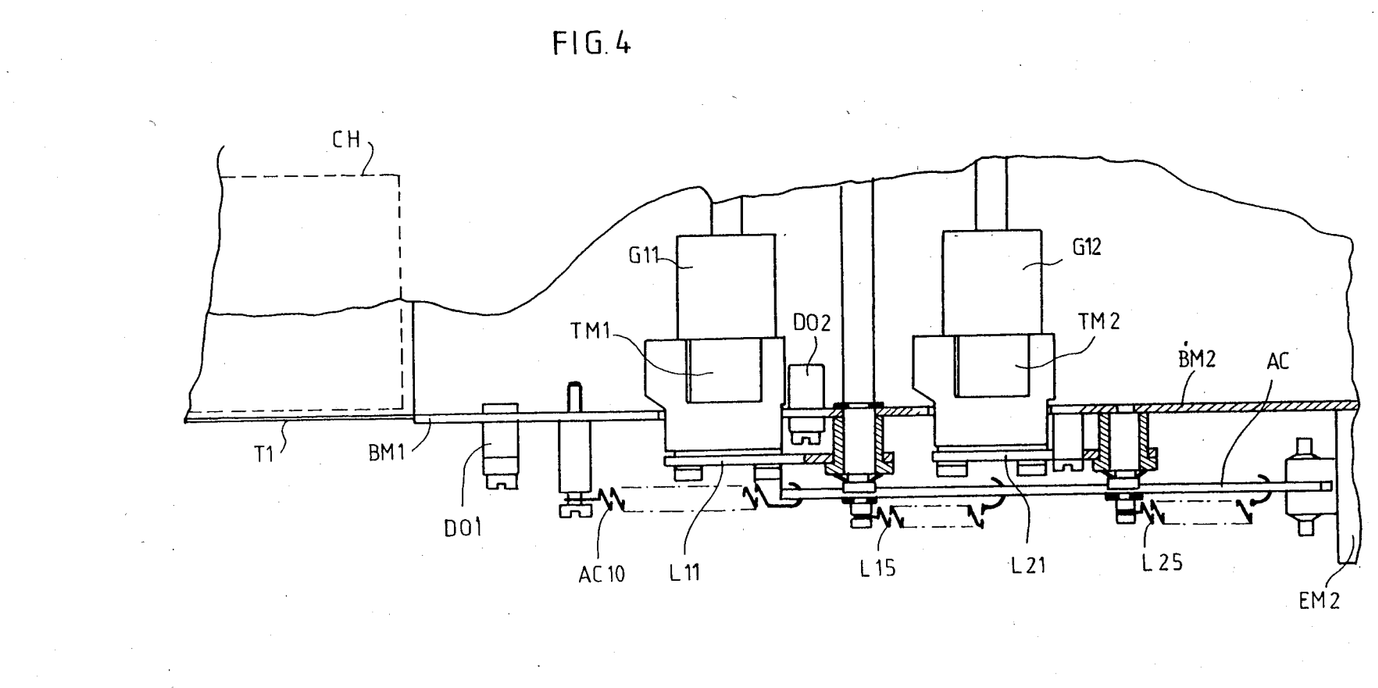
FIG. 4 is a plan view corresponding to FIG. 3 and showing a check.

A different path is provided for the checks. This path begins with an inlet plate T1 having vertical edges and on which the check is placed. On arrival at an optical detector DO1 (for detecting the edge of the check), the check actuates a drive mechanism based on a second stepper motor MPP2, which drives wheels G1 and G2 to cause the check to pass through portions T2 and then T3 of its path at controlled speed. The leading edge of the check is detected by a detector DO2 which informs the central unit UCL that it is time to generate a signal enabling CMC7 characters to be read. As explained below, these characters are read by a head TM2 placed opposite the wheel G2, and a head TM1 placed opposite the wheel G1 serves to premagnetize the CMC7 characters on the check prior to their being read, (FIGS. 2 to 4).

After being read the check is raised into a position against the backing plate CP in order to receive printing. Printing is then performed. In particular, the amount of the transaction, the date, the name of the beneficiary, and the place of the transaction are printed in clear. It may be observed that the printing takes place in columns since the print head moves perpendicularly to the normal direction of writing on the check. This makes it possible to generate characters using a character set which is different from those use by conventional matrix printers (e.g. using a double height format). This considerably reduces the risk of fraud.

After printing on the check in portion T5 of its path, the check may either be ejected upwardly, or it may be reversed to return to the plate T1. Returning to the plate T1 is the preferred arrangement.

Further, by passing the check through the printer a second time, it is possible to print the number of the ticket associated with the transaction on the back of the check together with the shopkeeper's endorsement and any other information that may be appropriate.

Reference is now made specifically to FIGS. 3 and 4 for a more detailed description of the reader and of the magnetic characters of a check.

The premagnetization head TM1 is disposed above the wheel G1. This head is mounted at the end L11 of an L-shaped crank L1. At its angle L10, the crank is pivoted about an axis L13 to the frame BM. The other arm L12 of the crank points downwardly and has a peg L14 which is engaged in a first oblong slot AC11 in an actuator rod AC. One end of a spring L15 is fixed to the peg L14 and the other end of the spring L15 is fixed to the rod AC.

In the rest position, the premagnetization head TM1 is at a distance from the wheel G1. When an electromagnet EM2 is actuated, under the control of the control unit UCL, its core draws the rod AC linked to it, with the result that the rod AC is displaced towards the right (as shown in the figures) and consequently the slot AC11 thereof moves past the peg L14. However, the peg is resiliently urged rightwardly at the same time, thereby lowering the head TM1 towards the wheel G1. In this embodiment, the point at which the spring L15 is fixed to the rod AC is thus to the right of the slot AC11 in which the peg L14 is received. A return spring AC10 is provided to the left free end of the rod AC and is fixed to the frame so as to return the heads to their normal rest position when the electromagnet EM2 is released.

The read head TM2 is similarly mounted and there is thus no need to describe all the details of its mounting.

A second crank L2 is pivoted at its angle L20 to the frame and has the read head TM2 mounted at the end of one of its arms L21 and has its other arm L22 fitted with a peg L24 which is received in an oblong slot AC12 and which is resiliently urged to the right by a spring L25.

Although such an arrangement is unusual, it has turned out that this disposition provides excellent reading of CMC7 characters on a check, and this is true in spite of the various kinds of degradation to which such characters may have been subjected.

The check is driven by the wheels G1 and/or G2 being themselves driven by the above-mentioned stepper motor, or by equivalent drive means. The wheels G1 and G2 are naturally coated in a suitable material, e.g. a neoprene having a Shore A hardness of 40 as sold by Dupont de Nemours.

FIG. 4 is a plan view in section taken along a dot-dashed line A—A of FIG. 3. It shows a blank check CH at the beginning of insertion on the plate T1. Unlike FIG. 3, FIG. 4 also shows the optical detectors DO1 and DO2. Further, this figure shows backing wheels G11 and G12 located behind the magnetic heads TM1 and TM2 and situated opposite the wheels G1 and G2. The backing wheels may be coated with the same peripheral material as the wheels G1 and G2.

Figure 5:
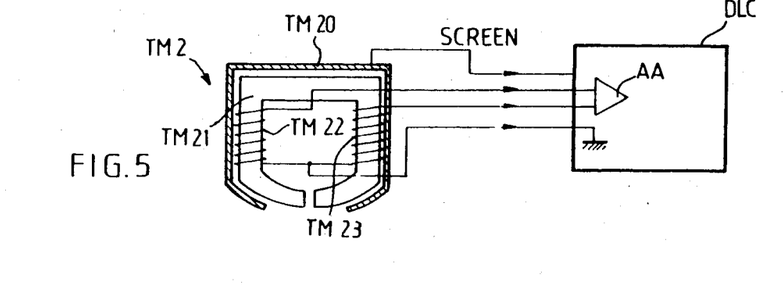
FIG. 5 is a diagram of a screened read head used in accordance with the present invention.

Reference is now made to FIG. 5 which is a diagram of the magnetic head TM2 which is connected to a character reader electronic card DLC. The magnetic head TM2 includes screening TM20 inside which a magnetic circuit TM21 is mounted. Two windings TM22 and TM23 are provided on the magnetic circuit, together with a common point. The magnetic gap TM21 is about 40 microns across, in conventional manner. It turns out that a screened magnetic read head of this type, as available from the U.K. company Magnetic Components Ltd. provides best reading of CMC7 characters marked on a check. Four leads run from this read head, namely one lead connected to the common point between the two windings TM22 and TM23, two other leads connected to the ends of said windings and also connected to inputs of an amplifier AA and a final lead connected to the screening TM20.

Figure 6:
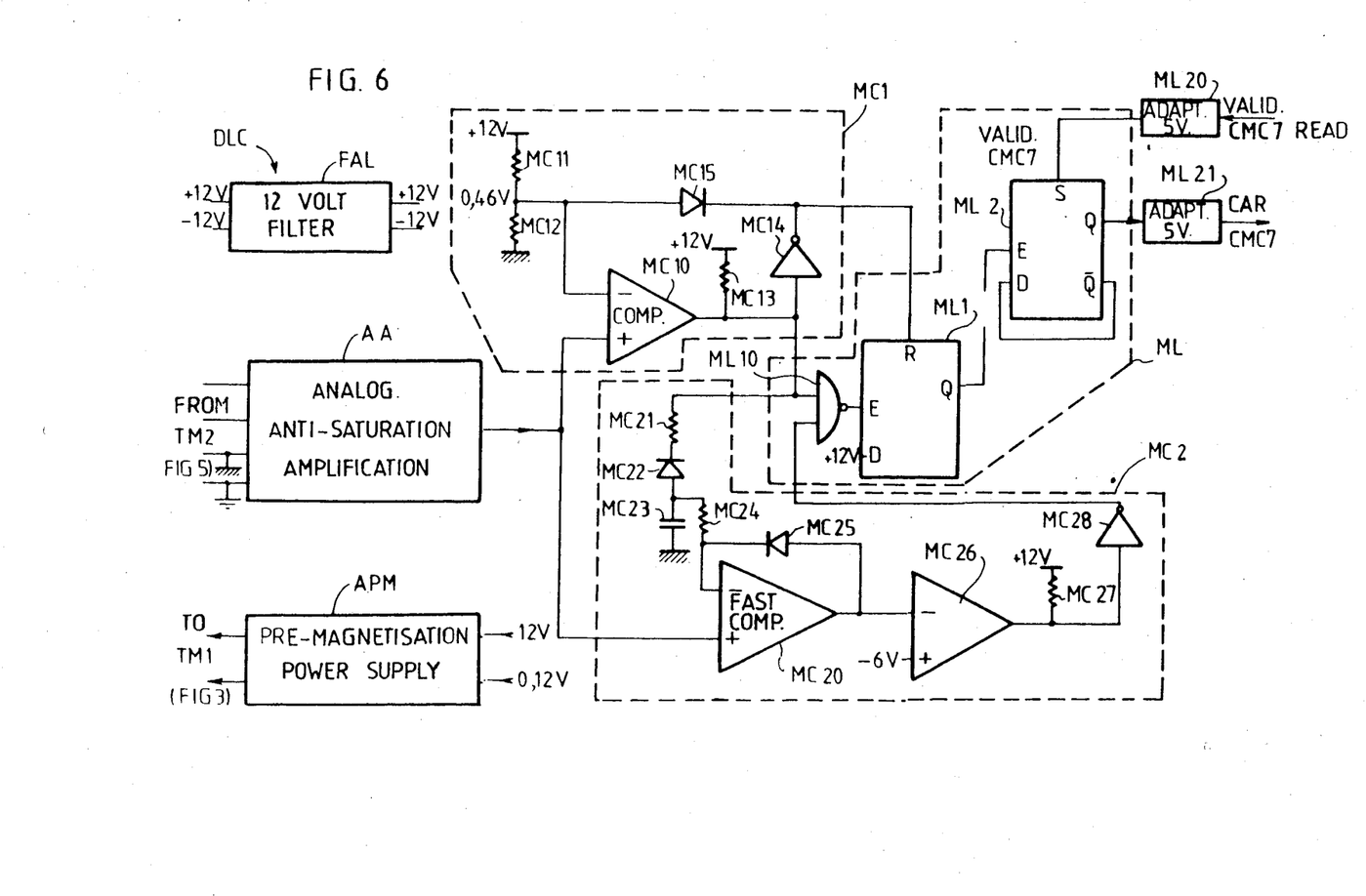
FIG. 6 is an electric circuit diagram, partially in block form, and partially in detailed form of the CMC7 character reader means.

Reference is now made to FIG. 6 which is an overall circuit diagram of the character reader DLC shown in FIG. 5.

Although most of the control logic unit operates at a single +5 volt supply voltage, the reader DLC operates from +12 and −12 volts, which supply voltages are initially filtered by a circuit FAL. A premagnetization power supply APM feeds the premagnetization head TM1 from said voltages. In a variant, the premagnetization head may be replaced by a permanent magnet head.

The above-mentioned four connections from the read head TM2 (see FIG. 5) are applied to an anti-saturation analog amplifier chain given the overall reference AA. A preferred embodiment thereof is described below. This amplification chain provides analog electrical signals which are representative of the transducer function performed by the head TM2.

These signals are applied to two comparator circuits MC1 and MC2 which operate together to excite a logic circuit MAL which in turn supplies the CMC7 characters as read.

Figure 7:
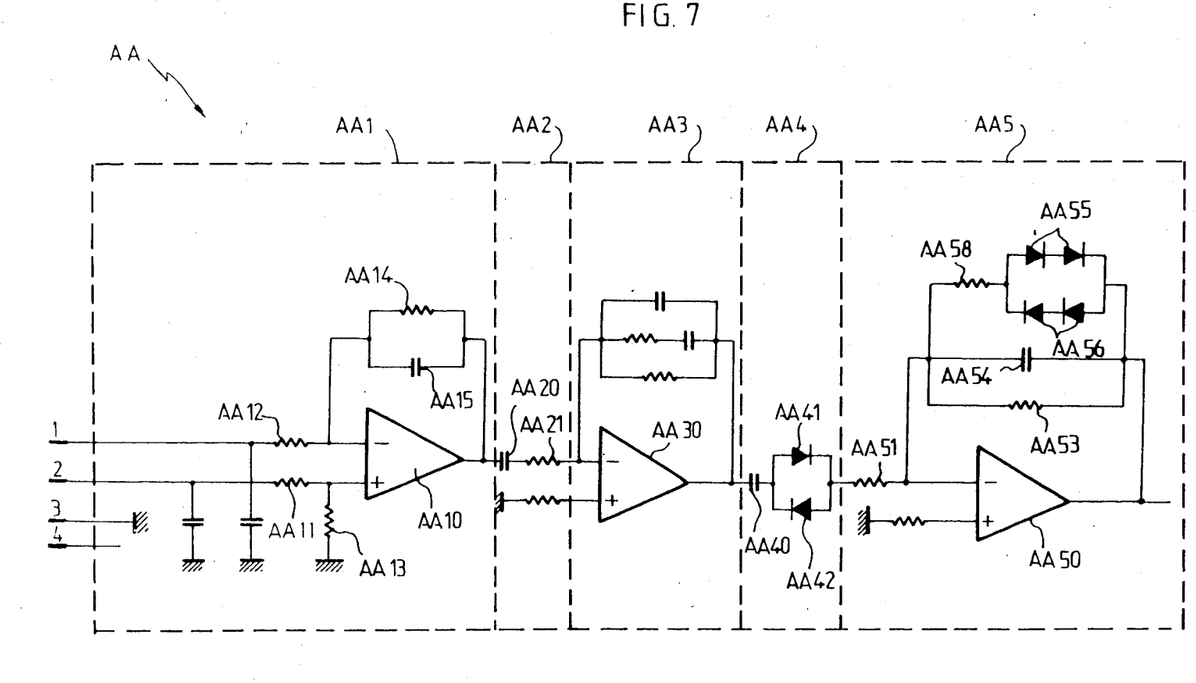
FIG. 7 is a detailed circuit diagram of the analog amplifier shown in FIG. 6.

FIG. 7 shows the detailed structure of the amplifier chain AA. The two live signals from the windings TM22 and TM23 are marked 1 and 2 respectively. They are applied to to a low-noise preamplifier AA1. This amplifier comprises a differential amplifier AA10 (e.g. a type ADOPO7 sold by the U.S. company Analog Devices). The signals 1 and 2 are respectively applied to the inverting input and the non-inverting input of the amplifier AA10. Each of said inputs has a parallel-connected capacitor of 2.2 picofarads leading to signal ground and includes a series resistance of 330 kilohms, e.g. resistors AA11 and AA12. The non-inverting input is connected to ground via a 390 kilohm resistance AA13 (all numerical values are given by way of example). Finally, the inverting input of the amplifier AA10 is connected to its output via a parallel network including a resistance AA14 which is equal to the resistance AA13, together with a capacitor AA15 having a capacitance of about 100 picofarads.

This low-noise preamplifier is followed by a connection AA2 suitable for eliminating mains rumble (at 50 Hz in France). To this end, a capacitor AA20 having a value of 22 nanofarads is connected in series with a resistance AA21 having a value of 3300 ohms, which resistance is in turn connected to the inverting input of a subsequent amplifier AA30 which constitutes a part of an amplifier stage AA3. The non-inverting input of the amplifier AA30 (e.g. an LM358 type amplifier made by Motorola) is connected to ground via a resistance of 3300 ohms.

Between the output and the input of the amplifier AA30, there is a feedback and filtering network comprising the following components connected in parallel:
  a 100 picofarad capacitor;
  a 10 kilohm resistance in series with a 220 picofarad capacitor; and
  a 220 kilohm resistance.

The output from the amplifier AA30 is connected to a noise-suppressing link. To this end, the portion AA4 of the means AA begin with a capacitor AA40, having a value of 1 microfarad, for example, and followed by two diodes AA41 and AA42 connected back-to-back and in parallel. These two diodes are silicon diodes, such as 1N4148 type diodes having a threshold voltage of 0.2 to 0.3 volts.

The output from the section AA4 is then applied to the last stage AA5 which is a "logarithmic" gain amplifier stage, i.e. a stage whose gain characteristic is non-linear so as to avoid saturation. The connection is provided by a 33 kilohm resistance AA51 to the inverting input of an amplifier AA50 which may be another LM 358, for example. Its non-inverting input is connected to ground via another resistance of the same value as the resistance AA51.

The feedback network connected between the output and the inverting input of the amplifier AA50 includes one part having a resistance AA53 (e.g. 330 kilohms) connected in parallel with a 100 picofarad capacitance AA54, and with a third part which is constituted by two series-connected pairs of diodes AA55 and AA56, said series-connected pairs being connected in parallel with each other and being connected to conduct in opposite directions, and in series with a resistance AA58 of 82 kilohms, for example.

The logarithmic or anti-saturation characteristic of the stage A5 is essentially provided by the two pairs of diodes AA55 and AA56.

Figure 8A:
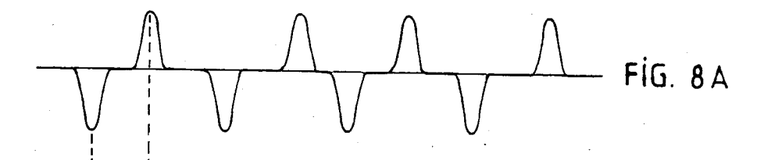
Figures 8B, 9A, 9B:
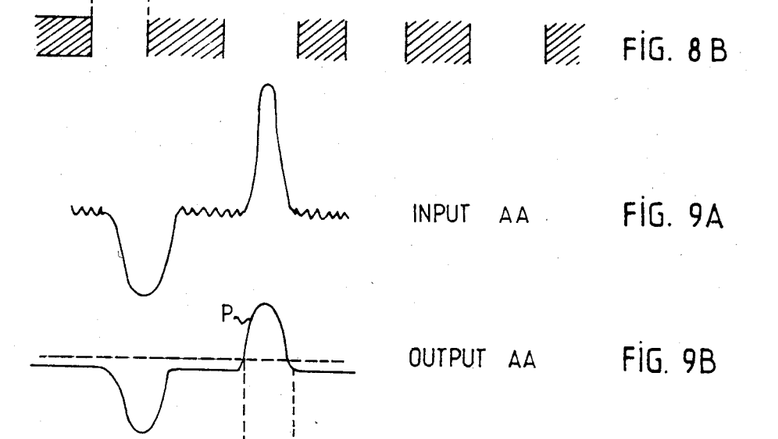

Reference is now made to FIGS. 8A and 8B. FIG. 8B is a diagram of portions of CMC7 characters (and these characters are shortened in the vertical direction). Adjacent to these character portions, FIG. 8A shows the magnetic transitions as read by the head TM2 (the theoretical signal is shown without any noise superposed thereon).

FIG. 9A shows the corresponding signal likely to appear at the input to the amplifier chain, and including various types of degradation which consists in noise levels occurring around zero and also in the adjacent positive and negative half-cycles being of different shapes. FIG. 9B shows how the output from the amplifier chain AA is constituted by a signal which is noise-free, in particular because of the mains-rumble filter AA2 and because of the connection AA4 which serves to filter noise in the vicinity of zero volts, or more precisely the DC component defined by the capacitor AA40. Further, the logarithmic or anti-saturation characteristic of the stage AA5 serves to diminish the amplitude differences which exist between successive signals, and in particular between a negative signal and a positive signal (given by way of example) even though the negative-going signals are not actually used thereafter. Further, the circuit AA5 avoids sharp clipping of high-amplitude signals, which would impede determination of their peaks, which is required, as is explained below.

We return now to FIG. 6. The output signal as shown in FIG. 9B is simultaneously applied to two comparator circuits MC1 and MC2.

Figure 9C:
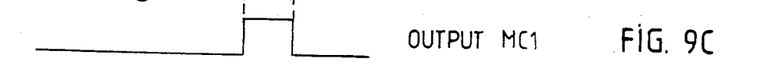

The comparator circuit MC1 comprises a comparator amplifier MC10 whose non-inverting input receives the output from the circuit AA. Its inverting input is connected to a potential divider which normally provides 0.46 volts from resistors MC11 and MC12 connected in series between the +12 volts supply and ground. The output from the comparator MC10 is connected to the +12 volt supply via a resistor MC13. It is also connected to an inverting amplifier MC14 whose output is connected to the cathode of a diode MC15 whose anode is connected to the inverting input of an amplifier MC10. When the output from the comparator MC10 is low, the output from the inverter MC14 is high, and the diode MC15 is off, so that a voltage of 0.46 volts is applied to the inverting input of the comparator MC10. It is in this state when it receives the FIG. 9B signal. It will then pass suddenly to the high state when the positive-going half-cycle P of FIG. 9B exceeds 0.46 volts, as illustrated in FIG. 9C. At this moment, the output from the inverter MC14 goes low and the diode MC15 (which is a Schottky diode having a threshold of 0.1 volts) is switched on and changes the reference voltage applied to the inverting input of the comparator MC10 to 0.1 volts. The output signal from the comparator, as shown in FIG. 9C, can then only return to a logical zero when the half-cycle P drops below about 0.1 volts. This provides hysteresis in the operation of the comparator circuit MC1. The comparator MC10 may be a LM319 type circuit as made by National Semiconductor.

The comparator circuit MC2 comprises a fast-acting comparator amplifier MC20 such as a TDB0353DP type sold by the French company Thomson-CSF. The non-inverting input of the comparator MC20 is connected to the output from the amplifier chain AA. Its output is connected to the anode of a diode (type 1N4148) MC25 whose cathode is connected to the inverting input of the same amplifier. This input is also connected via a resistor MC24 (e.g. 100 ohms) to a capacitor MC23 (e.g. 22 nanofarads). The capacitor MC23 is also connected to ground. Its common point with the resistor MC24 is connected to the anode of a Schottky diode MC22 whose cathode is connected to a resistor MC21 leading to the output from the comparator MC10.

During negative half-cycles or passages at around zero volts in the signal from the amplifier chain AA, the output from the comparator MC10 is low and the diode MC22 thus prevents the capacitor MC23 from charging to more than 0.1 volts. The inverting input of the capacitor MC20 thus receives this voltage as a reference voltage and its non-inverting input receives a lower voltage during the same period (at least in theory) and as a result the output from the comparator MC20 is fixed at about −12 volts. The diode MC25 is thus off. Any signal which may appear, in an unwanted manner, at the output of the comparator MC20 will in any case be inhibited by the fact that the NAND gate ML10 (described below) also requires the output from the comparator MC10 to go high.

Figure 9D:
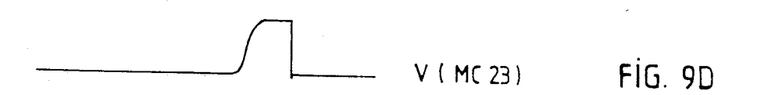

When this condition is satisfied, the capacitor MC23 may begin to charge. Charging will begin as soon as the voltage present at the non-inverting input of the comparator MC20 rises, as shown in FIG. 9D, and will continue throughout the beginning of the positive half-cycle P of the output signal from the amplifier chain AA. Once the positive half-cycle P has reached its peak, the charge on the capacitor is maintained until the output from the comparator MC10 returns to a low level.

Figures 9E, 9F:
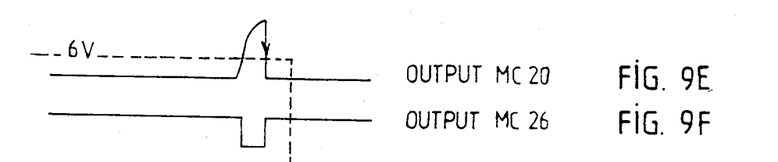

As shown in FIG. 9E, the output from the comparator MC20 rises while the capacitor MC23 is charging, i.e. during the rising portion of the positive half-cycle P of FIG. 9B. It rises to around 12 volts. However, when the positive half-cycle P begins to fall off, the output from the comparator MC20 drops suddenly to zero, thereby providing a transition which is useful for the logic signals.

Figures 9G, 9H:
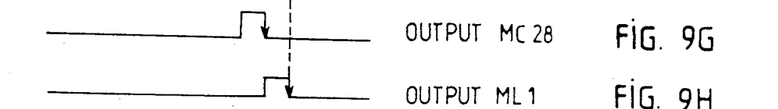

This output is applied to the inverting input of a comparator MC26 (e.g. the above-mentioned LM319 type) whose non-inverting input receives a reference voltage of −6 volts. As a result a rectangular pulse as shown in FIG. 9F is generated at the output of the comparator MC26, which output is pulled up to +12 volts by a resistance MC27. An inverting amplifier MC28 then provides a signal such as illustrated in FIG. 9G, which is applied to the second input of the NAND gate ML10, whose first input receives the output from the comparator MC10. The output from the NAND gate is applied to the clock input of a bistable ML1 which is used as a memory bistable. The D input of this bistable receives a +12 volt signal. Its reset to zero input R is connected to the output from the inverter MC14. This bistable is thus forced to the zero state so long as the comparator MC10 has its output in the low state. When said output is in the high state, the signal provided by the NAND gate ML10 in response to the comparator circuit MC2 enables the state of the bistable ML1 to change. This state returns to zero as soon as the output from the comparator circuit MC1 returns to zero.

Finally, the logic means ML include a second bistable whose clock input is connected to the Q output of the first bistable ML1. This bistable is mounted as a divide-by-two circuit with its inverted output $\overline{Q}$ being connected to its D input. The enable input S of the bistable ML2 requires a read enable signal from a microprocessor in the unit UCL via a voltage changing or adaptor circuit ML20 for changing 5 volts to 12 volts.

Figure 9J:
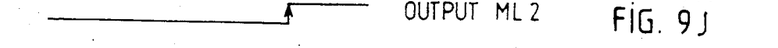

The Q output from the bistable ML2, which provides the read signal per se is similarly connected via an adaptor circuit ML21 to change +12 volts to +5 volts, the output from which adaptor circuit provides a signal representative of the CMC7 characters, as can be seen in FIG. 9J.

The above-described circuit has numerous important advantages, including the fact that the first comparator circuit MC1 avoids taking account of bounce in the incident signal around the value zero, and thereby defines what might be called read "windows". The second comparator circuit MC2, which is theoretically sensitive to any passage of the incident signal below zero is, in fact, only operative when said window is open. Conversely, when said window is open only one transition from the second comparator circuit MC2 can be taken into account, unlike the plurality of transitions which could be taken into account in the above-mentioned case of bounce.

Experience has shown that the arrangements described above for reading CMC7 characters provides excellent results with an extremely low error rate. It is thus possible to directly insert the characteristics of the check in the form of electrical signals into a local memory such as a diskette ML (see FIG. 1) or into any other kind of portable memory. This local memory may serve as an electronic journal for the shopkeeper, and stores not only transactions as their characteristics, but also the characteristics of the accompanying means of payment. This can considerably simplify keeping full accounts. The same diskette, or a copy thereof, or some other diskette, may also store information relating to each of the checks received by a given shopkeeper, i.e. the characteristics of the check itself, together with the amount and the date thereon, and optionally the identity of the shopkeeper.

In a variant, or additionally, the characteristics of the check are transmitted by line to a distant memory, which may be located in the shopkeeper's bank.

We claim:

1. In a magneto-opical character reader for reading characters such as CMC7 characters, the reader comprising a path suitable for receiving and driving a document carrying such characters through predetermined positions, a premagnetization transducer for premagnetizing said characters, a read transducer for reading said characters, and electronic control and processing means connected to said transducers, the improvement wherein said path for receiving the document includes wheels having axes fixed relative to a frame, and said transducers being mounted opposite a respective one of said wheels and being controllably and resiliently urgeable towards said respective wheel.

said electronic control and processing means including read means comprising:
   analog amplifier means having an anti-saturation gain characteristic;
   first comparator means possessing hysteresis and having a signal input connected to the output of said analog amplifier means, and a reference input receiving a reference voltage close to zero volts, an output, and an output to said reference input to provide said hysteresis;
   second, fast-acting comparator means having a signal input connected to the output of said analog amplifier means, a reference input connected to the output from the first comparator via a capacitative circuit including a diode, and an output connected to said input via a diode link; and
   logic means for providing a logic signal representative of the characters read on the basis of the output signals from said two comparator means.

2. A reader according to claim 1, wherein each transducer is mounted at the end of one arm of a corresponding L-shaped crank, each of said cranks being pivoted at its angle to the frame, and the ends of the other arms of said cranks being controlled via respective resilient means by an actuator rod which is controlled by an electromagnet.

3. A reader according to claim 2, wherein the actuator rod is itself provided with resilient return means operating against the electromagnet.

4. A reader according to claim 1, wherein said analog amplifier means comprise, connected in series:
   a low-noise preamplifier;
   a mains rumble filter;
   an amplifier;
   a background noise limiter circuit; and
   an amplifier having a non-linear, anti-saturation gain characteristic.

5. A reader according to claim 1, wherein said logic means comprise:
   a first bistable acting as a storage cell, including a clock input controlled via a NAND gate from the outputs of said first and second comparator means, and a reset to zero input controlled by the output from said first comparator means; and
   a second bistable connected as a divide-by-two circuit, controlled by the output from the first bistable, and providing a logic signal representative of the characters read.

6. A reader according to claim 1, further including electronic means suitable for performing a commercial transaction, together with printer means and control logic means, the reader including the improvement whereby said control logic means are arranged to provide, after a commercial transaction has been performed, a sequence of commands suitable for reading the magneto-optical characters on a check and for printing the amount of the transaction on said check.

7. A reader according to claim 6, wherein printing is performed on the check in columns using a special character set.

8. A reader according to claim 6, wherein the logic control means also include means for printing a client ticket and a shopkeeper's journal.

9. A reader according to claim 6, wherein the logic control means are additionally suitable for providing a local or distant memory with electrical signals representative of the characters read on the check and of the characteristics of a transaction, thereby simplifying bank processing of said checks.

* * * * *